US012062011B1

(12) United States Patent
Lu et al.

(10) Patent No.: US 12,062,011 B1
(45) Date of Patent: Aug. 13, 2024

(54) TOKEN ALLOCATION FOR DISTRIBUTED SHIPPING DOCUMENT PROCESSING

(71) Applicant: Stamps.com Inc., El Segundo, CA (US)

(72) Inventors: Yang Lu, Los Angeles, CA (US); Jonathan Michael Bourgoine, Encino, CA (US)

(73) Assignee: AUCTANE, INC., Austin, TX (US)

( * ) Notice: Subject to any disclaimer, the term of this patent is extended or adjusted under 35 U.S.C. 154(b) by 157 days.

(21) Appl. No.: 17/751,611

(22) Filed: May 23, 2022

Related U.S. Application Data

(62) Division of application No. 16/550,670, filed on Aug. 26, 2019, now Pat. No. 11,361,275.

(51) Int. Cl.
G06Q 10/08 (2024.01)
G06Q 10/083 (2023.01)

(52) U.S. Cl.
CPC .................. G06Q 10/0838 (2013.01)

(58) Field of Classification Search
CPC ........................ G06Q 10/0833; G06Q 10/0838
See application file for complete search history.

(56) References Cited

U.S. PATENT DOCUMENTS

| 10,706,414 B1* | 7/2020 | Lieberman | G06Q 20/4016 |
| 11,310,164 B1* | 4/2022 | Korman | H04L 47/6225 |
| 2010/0140340 A1* | 6/2010 | Hoffman | G07B 17/00024 |
| | | | 235/375 |

OTHER PUBLICATIONS

Lowe, W. (2005). Data driven simulation of the united parcel service automated hub (Order No. 1428788). Available from ProQuest Dissertations and Theses Professional. (304989949). Retrieved from https://dialog.proquest.com/professional/docview/304989949?accountid=131444 (Year: 2005).*
Illie-Zudor, E. et al., "A survey of applications and requirement of unique identification systems and RFID techniques," Computers in Industry, vol. 62, No. 3, 2011, pp. 227-252.

* cited by examiner

Primary Examiner — Scott M Tungate
(74) Attorney, Agent, or Firm — Tong, Rea, Bentley & Kim, LLC

(57) ABSTRACT

Systems and methods which provide for allocation of tokens, such as may be used for tracking number dissemination, for shipment document processing are described. Embodiments operate to allocate tokens to the various shipping document processing systems for their use by the respective document processing systems. The various shipping document processing systems may be enabled to independently perform shipping document processing for extended periods of time (e.g., days, weeks, etc.) using their respective allocations of tokens, such as to use the tokens, including reuse of the tokens over time, without overlap (e.g., without introducing overlapping instances of tracking numbers). Logic of shipping document processing systems record use time information (e.g., a date and/or time of use of a token or tokens) in association with their use of tokens of their allotment, wherein the use tokens from the allocations is in accordance with last use time information.

17 Claims, 12 Drawing Sheets

| Token Pool | | | | | |
|---|---|---|---|---|---|
| Token Block | Beginning Token | Ending Token | Begin Use Time | End Use Time | Allocation Status |
| 01 | 01001 | 02000 | 2/28/2018 | 3/15/2018 | 1 |
| 02 | 02001 | 03000 | 3/15/2018 | 3/31/2018 | 1 |
| 03 | 03001 | 04000 | 3/1/2018 | 4/2/2018 | 1 |
| 04 | 04001 | 05000 | 3/18/2018 | 4/6/2018 | 3 |
| 06 | 06001 | 07000 | 4/1/2018 | 5/1/2018 | 2 |
| 07 | 07001 | 08000 | 4/1/2018 | 5/5/2018 | 2 |
| 05 | 05001 | 06000 | 5/1/2018 | 5/30/2018 | |
| 08 | 08001 | 09000 | 4/4/2018 | 5/31/2018 | |
| | | | | | |
| 68 | 68001 | 69000 | 6/15/2019 | 7/4/2019 | |
| 69 | 69001 | 70000 | 6/30/2019 | 7/18/2019 | |
| 67 | 67001 | 68000 | 7/1/2019 | 7/23/2019 | |

FIG. 3B

| Token Block | Beginning Token | Ending Token | Begin Use Time | End Use Time | Allocation Status |
|---|---|---|---|---|---|
| 02 | 02001 | 03000 | 3/15/2018 | 3/31/2018 | 1 |
| 03 | 03001 | 04000 | 3/1/2018 | 4/2/2018 | |
| 04 | 04001 | 05000 | 3/18/2018 | 4/6/2018 | 3 |
| 06 | 06001 | 07000 | 4/1/2018 | 5/1/2018 | 2 |
| 07 | 07001 | 08000 | 4/1/2018 | 5/5/2018 | 2 |
| 05 | 05001 | 06000 | 5/1/2018 | 5/30/2018 | |
| 08 | 08001 | 09000 | 4/4/2018 | 5/31/2018 | |
| | | | | | |
| 68 | 68001 | 69000 | 6/15/2019 | 7/4/2019 | |
| 69 | 69001 | 70000 | 6/30/2019 | 7/18/2019 | |
| 67 | 67001 | 68000 | 7/1/2019 | 7/23/2019 | |
| 01 | 01001 | 02000 | 7/4/2019 | 7/22/2019 | |

FIG. 3C

| Token Pool |||||||
|---|---|---|---|---|---|
| Token Block | Beginning Token | Ending Token | Begin Use Time | End Use Time | Allocation Status |
| 02 | 02001 | 03000 | 3/15/2018 | 3/31/2018 | 1 |
| 03 | 03001 | 04000 | 3/1/2018 | 4/2/2018 | 1 |
| 04 | 04001 | 05000 | 3/18/2018 | 4/6/2018 | 3 |
| 06 | 06001 | 07000 | 4/1/2018 | 5/1/2018 | 2 |
| 07 | 07001 | 08000 | 4/1/2018 | 5/5/2018 | 2 |
| 05 | 05001 | 06000 | 5/1/2018 | 5/30/2018 | 1 |
| 08 | 08001 | 09000 | 4/4/2018 | 5/31/2018 | 1 |
|  |  |  |  |  |  |
| 68 | 68001 | 69000 | 6/15/2019 | 7/4/2019 |  |
| 69 | 69001 | 70000 | 6/30/2019 | 7/18/2019 |  |
| 67 | 67001 | 68000 | 7/1/2019 | 7/23/2019 |  |
| 01 | 01001 | 02000 | 7/4/2019 | 7/22/2019 |  |

FIG. 3D

| Token Allocation | | | | | | |
|---|---|---|---|---|---|---|
| Token Block | Beginning Token | Ending Token | Next Token | Begin Use Time | End Use Time | Token Block Status |
| 01 | 01001 | 02000 | 02000 | 7/4/2019 | 7/22/2019 | Used |
| 02 | 02001 | 03000 | 02101 | 7/22/2019 | | In Use |
| 03 | 03001 | 04000 | 03001 | 3/1/2018 | 4/2/2018 | Available |

FIG. 4A

| Token Allocation | | | | | | |
|---|---|---|---|---|---|---|
| Token Block | Beginning Token | Ending Token | Next Token | Begin Use Time | End Use Time | Token Block Status |
| 06 | 06001 | 07000 | 06995 | 7/10/2019 | | In Use |
| 07 | 07001 | 08000 | 07001 | 4/1/2018 | 5/5/2018 | Available |

FIG. 4B

| Token Allocation ||||||| 
|---|---|---|---|---|---|---|
| Token Block | Beginning Token | Ending Token | Next Token | Begin Use Time | End Use Time | Token Block Status |
| 04 | 04001 | 05000 | 04755 | 7/8/2019 | | In Use |

FIG. 4C

| Token Allocation ||||||
|---|---|---|---|---|---|
| Token Block | Beginning Token | Ending Token | Next Token | Begin Use Time | End Use Time | Token Block Status |
| 02 | 02001 | 03000 | 02101 | 7/22/2019 | | In Use |

FIG. 5

| Token Allocation | | | | | | |
|---|---|---|---|---|---|---|
| Token Block | Beginning Token | Ending Token | Next Token | Begin Use Time | End Use Time | Token Block Status |
| 02 | 02001 | 03000 | 02101 | 7/22/2019 | | In Use |
| 03 | 03001 | 04000 | 03001 | 3/1/2018 | 4/2/2018 | Available |
| 05 | 05001 | 06000 | 05001 | 5/1/2018 | 5/30/2018 | Available |
| 08 | 08001 | 09000 | 08001 | 4/4/2018 | 5/31/2018 | Available |

FIG. 6

TOKEN ALLOCATION FOR DISTRIBUTED SHIPPING DOCUMENT PROCESSING

CROSS-REFERENCED TO RELATED APPLICATIONS

The present application is a division of U.S. patent application Ser. No. 16/550,670 filed Aug. 26, 2019 and entitled "TOKEN ALLOCATION FOR DISTRIBUTED SHIPPING DOCUMENT PROCESSING," the disclosure of which is incorporated by reference herein in its entirety.

TECHNICAL FIELD

The invention relates generally to processing with respect to shipment of items and, more particularly, to token allocation for distributed shipment document processing, such as for tracking number dissemination.

BACKGROUND OF THE INVENTION

The shipment of items, such as new and used goods shipped from merchants or other shippers to purchasers or other recipients, has been commonplace for years. For example, various merchants, whether they be "brick and mortar" merchants, online merchants, or sellers through an electronic marketplace (e.g., eBay, Amazon Marketplace, Shopify, etc.), ship goods using a number of forms of shipping services and media, such as letters, flats, and parcels, via various shipping service providers, such as the United States Postal Service (USPS), United Parcel Service (UPS), Federal Express (FedEx), Dalsey, Hillblom and Lynn (DHL), and local and regional couriers, trucking companies providing truckload (TL) services and/or less than truckload (LTL) services (e.g., J.B. Hunt, Arkansas Best Freight (ABF), YRC Freight, etc.), and/or the like.

With the advent of the Internet and the introduction of innumerable e-commerce merchants and marketplaces, not only have the number of items shipped increased appreciably in recent years, but so too have the number of shippers and recipients of such items. Moreover, even small sellers and individuals are provided with a global market, thus resulting in an ever increasing number of items being shipped. Accordingly, more and more shippers, including not only large scale business traditionally involved with high volume shipping but also smaller entities and individuals, are regularly shipping items.

Such shipment of items typically requires various processing to be performed with respect to the item to be shipped. For example, the item must typically be packaged or otherwise prepared for physical transport by one or more selected shipping service providers. Additionally, various shipping documents (e.g., bills of lading, packing slips, shipping labels, postage indicia, customs forms, etc.) are often required by the shipping service providers, or otherwise needed for facilitating the shipment of items.

Various forms of shipping document processing systems have been developed for use with respect to generating shipping documents for item shipments. For example, a shipping service provider system may comprise a shipper interface facilitating generation of various shipping documents for shipment of items using their shipping services. Additionally or alternatively, one or more systems of a shipping facilitation service may be provided for facilitating generation of shipping documents for shipment of times using the shipping services of one or more shipping service providers. As an example, Stamps.com Inc. provides the STAMPS.COM postage on demand system and Auctane LLC provides the SHIPSTATION shipping management system that, among other things, control postage indicia generation and generate shipping labels for use with respect to shipping items.

Some form of substantially unique identification, such as tracking numbers, may be assigned to individual shipments for use with respect to the shipping services. For example, tracking numbers may be included on shipping documents, such as shipping labels, to facilitate tracking the item's progress from a shipper to a recipient. The aforementioned shipping document processing systems may, for example, include a tracking number in shipping documentation (e.g., shipping labels) they generate or provide to shippers and/or otherwise associate a tracking number with the shipment.

Such tracking numbers typically comprise a sequence number assigned by a respective shipping service provider, possibly concatenated with other information such as mailer identification (ID). For example, a tracking number may be 16 characters (e.g., as may be comprised of 5 characters of mailer ID and 11 characters of sequence number, 9 characters of mailer ID and 7 characters of sequence number, etc.). It can be appreciated that the quantity of unique sequence numbers is limited, and thus sequence numbers are generally repeated over time. For example, a range of consecutive sequence numbers may be traversed serially and repeated as tracking numbers are used for various shipments processed via a shipping service provider. Although it is hoped that the tracking numbers remain substantially unique (i.e., although reused and thus not unique in a global sense, they are to remain unique over the useful life of any instance of a tracking number), the reuse of sequence numbers is essentially blind and there are typically no mechanisms to prevent instances of overlapping use (failure of substantially uniqueness) of instances of the tracking numbers. Accordingly, it is not unheard of for a shipper to receive tracking information for another shipper's item as a result of sequence number reuse.

BRIEF SUMMARY OF THE INVENTION

The present invention is directed to systems and methods which provide for allocation of tokens (e.g., sequence numbers, series of different alphanumeric or character strings, plurality of different symbols or symbol strings, etc.), such as may be used for tracking number dissemination, for shipment document processing. For example, distributed shipment document processing infrastructure may be provided, such as comprising geographically distributed shipment document processing systems for facilitating generation of shipping documents for shipment of items using the shipping services of one or more shipping service providers, to support a large number of shippers throughout a large geographic region. Embodiments of the present invention operate to allocate tokens to the various shipping document processing systems for their use by the respective document processing systems in association with shipping document processing. For example, the shipping document processing systems may utilize their token allocation for assigning tracking numbers to shipping documents processed by the respective systems. In operation according to embodiments, the various shipping document processing systems are enabled to independently perform shipping document processing for extended periods of time (e.g., day(s), week(s), month(s) etc.) using their respective allocations of tokens. Moreover, the shipping document processing systems of embodiments are enabled to disseminate or otherwise use the tokens, including reuse of the tokens over time, without overlap (e.g., without introducing overlapping instances of tracking numbers).

In operation according to embodiments, logic of shipping document processing systems record use time information (e.g., a date and/or time of use of a token or tokens) in association with their use of tokens of their allotment. Such use time information may, for example, indicate a last use time with respect the corresponding token or tokens, whereby embodiments of the invention utilize such information to facilitate reuse of the tokens without overlap (e.g., without introducing overlapping instances of tracking numbers). Embodiments of shipping document processing systems operate to use tokens from their respective allocations in accordance with last use time information (e.g., using tokens from the allocation having an oldest last use time first, wherein this last use time information is updated with use time information by the shipping document processing system).

A token coordinator system is utilized according to embodiments of the invention to provide token allocation and maintenance functionality. Accordingly, embodiments may provide a hybrid centralized and distributed architecture in which token allocation and maintenance functionality is centralized, while the use of the token allocations (e.g., in tracking number dissemination) is distributed to enable resilient simultaneous and independent dissemination or other use of the tokens by the shipping document processing systems.

Logic of a token coordinator system may determine token allocations for the various shipping document processing systems (e.g., based upon statistical, historical, predicted, etc. data for the shipping document processing systems) and allocate tokens of a pool of tokens to the individual shipping document processing systems for their independent operation over some period of time. Embodiments of a token coordinator system operates to allocate tokens to the shipping document processing systems in accordance with last use time information (e.g., allocating tokens having an oldest last use time first). Accordingly, logic of the token coordinator system may sort tokens of the pool of tokens based upon last use time information (e.g., a date of last use of a token or tokens). Logic of the token coordinator system may further provide token maintenance operations, such as to maintain token allocations based upon last use time information (e.g., a date of last use of a token or tokens), and periodically allocate, deallocate, and/or reallocate tokens with respect to the shipping document processing systems to facilitate use and reuse of the tokens without overlap (e.g., providing substantially unique tracking numbers). Operation of a token coordinator system according to embodiments of the invention provides balancing of token allocations for uninterrupted operation of the shipping document processing systems accommodating dynamic conditions, such as outages or failures of various of the systems, increases or decreases in demand at various of the shipping document processing systems, etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 3B-3D show instances of a token pool as may be utilized to allocate tokens according to embodiments of the present invention;

FIGS. 4A-4C, 5, and 6 show instances of token allocations as may be utilized to disseminate tokens according to embodiments of the present invention.

DETAILED DESCRIPTION OF THE INVENTION

Figure 1:
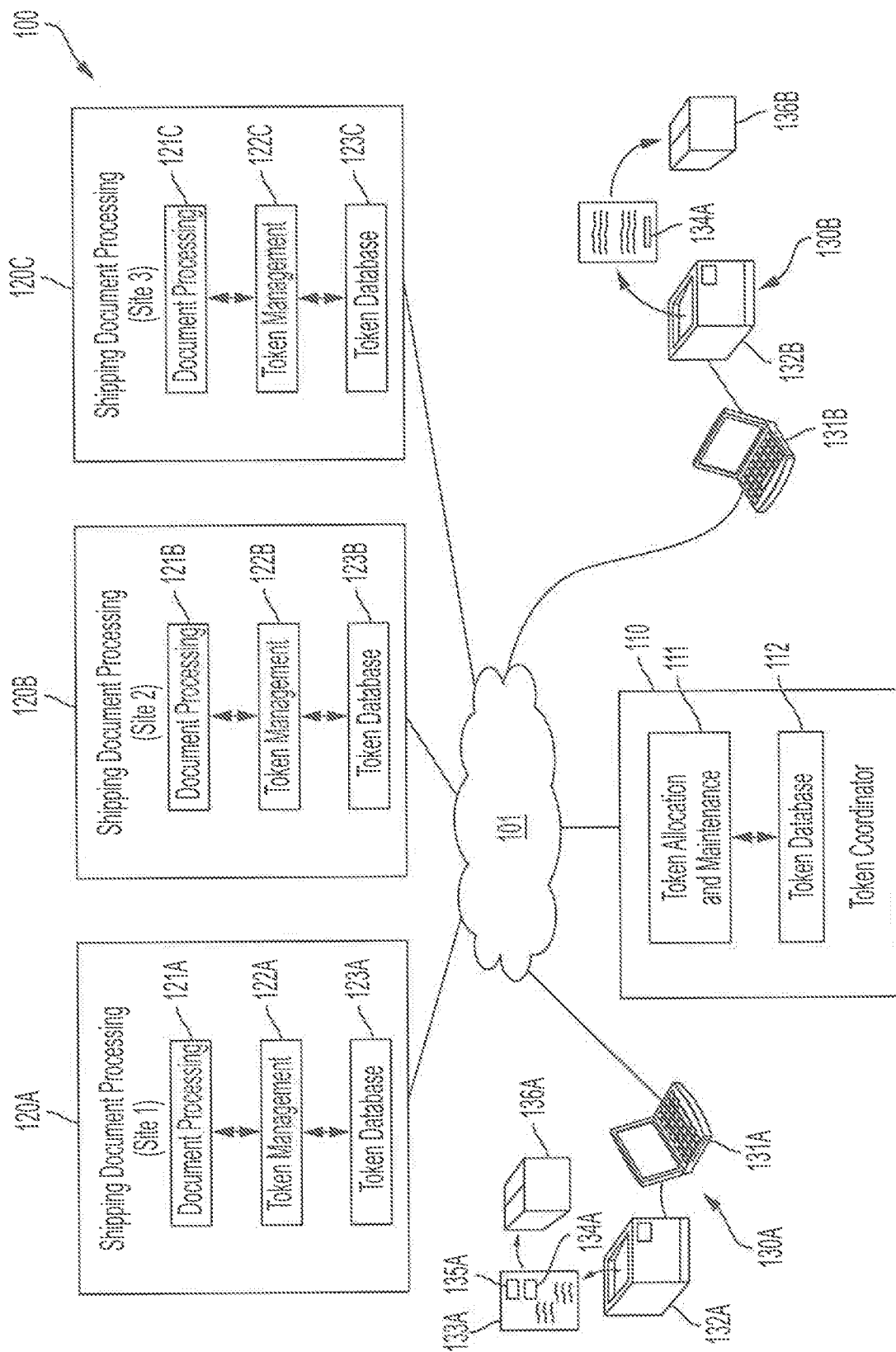
FIG. 1 shows a system configured to allocate tokens for use in shipping document processing according to embodiments of the present invention.

A system configured in accordance with a hybrid centralized and distributed architecture to allocate tokens for use in shipping document processing according to embodiments of the present invention is shown in FIG. 1. In particular, system 100 of FIG. 1 shows an implementation in which token coordinator system 110 provides centralized token allocation and maintenance functionality with respect to shipping documentation processing systems 120A-120C, wherein shipping documentation processing systems 120A-120C are deployed for distributed shipping documentation processing functionality. Shipping documentation processing systems 120A-120C may, for example, comprise geographically distributed shipment document processing systems supporting generation of shipping documents for a large number of shippers throughout a large geographic region. For example, shippers may interface with an appropriate one of shipping document processing systems 120A-120C (e.g., a currently operational one of the shipping document processing systems nearest the shipper's location, a shipping document processing system having capacity to provide processing for the shipper, etc.) using one of shipper systems 130A or 130B to generate shipping documents (e.g., shipping documents 133A and 130B, such as may comprise bills of lading, packing slips, shipping labels, postage indicia, customs forms, etc.) for shipment of items (e.g., items 136A and 136B) using the shipping services of one or more shipping service providers.

The illustrated embodiment of system 100 is simplified, showing only 1 instance of a token coordinator system, 3 instances of shipping document processing systems, and 2 instances of shipper systems, in order to present a concise example facilitating an understanding of the concepts here. It should be appreciated that systems implementing concepts of the present invention may comprise various numbers of token coordinator systems, shipping document processing systems, and/or shipper systems as appropriate for any particular implementation situation.

Communications by and between the various systems of system 100 (e.g., token coordinator system 110, shipping document processing systems 120A-120C, and/or shipper systems 130A and 130B) may be provided in whole or in part by network 101. Network 101 of embodiments may, for example, comprise one or more networks providing data communication between any or all of the foregoing systems. For example, network 101 may comprise a local area network (LAN), a metropolitan area network (MAN), a wide area network (WAN), a wireless LAN (WLAN), a cellular network, a cable transmission system, the public switched telephone network (PSTN), the Internet, an extranet, an intranet, and/or the like.

Each of token coordinator system 110, shipping document processing systems 120A-120C, and shipper systems 130A and 130B may comprise one or more processor-based system. For example, token coordinator system 110 and shipping document processing systems 120A-120C may comprise one or more computer-based server (e.g., cloud based application server, webserver, network server, etc.) operable under control of an instruction set (e.g., operating system, application program, applet, user interface, etc.) to provide the respective functionality. Correspondingly, shipper systems 130A and 130B may comprise one or more computer-based user terminal (e.g., personal computer (PC), notebook computer, etc.) operable to interface with one or more of shipping document processing systems 120A-120C to provide functionality described herein. Such processor-based systems may comprise one or more processors (e.g., a processor from the Intel CORE family of processors) having computer readable memory (e.g., random access memory (RAM), read only memory (ROM), hard disk drive memory, optical memory, solid state disk drive memory, flash memory, etc.) in communication therewith. The computer readable memory may store data and one or more instruction set providing functionality as described herein when executed by the one or more processors. The processor-based system may further have suitable infrastructure and/or peripheral devices (e.g., network interface card (NIC), display device, keyboard, digital pointer, printer, audio output device, wireless communications interface, etc.) to support the described functionality. Shipper systems 130A and 130B are, for example, shown as comprising computers 131A and 131B coupled to a respective one of printers 132A and 132B in the illustrated embodiment.

Although embodiments of token coordinator system 110, shipping document processing systems 120A-120C, and shipper systems 130A and 130B are described with reference to their being computer-based systems, the concepts of the present invention are not limited to such embodiments of processor-based systems. For example, one or more of the foregoing processor-based systems (e.g., shipper system 130A or 130B) may comprise a portable computing device, a tablet device, a smartphone, a personal digital assistant (PDA) and/or the like. As another example, one or more of the foregoing processor-based systems (e.g., shipping document processing system 120A, 120B, or 120C) may comprise a processor-based kiosk system, a point of sale terminal, and/or the like. Additionally or alternatively, one or more of the foregoing processor-based systems (e.g., token coordinator system 110, shipping document processing systems 120A-120C, and shipper systems 130A and 130B) may comprise one or more special purpose processors (e.g., application specific integrated circuits (ASICs), programmable gate arrays (PGAs), etc.) configured to perform some or all the respective functionality described herein.

Shipping document processing systems 120A-120C of embodiments provide shipping document processing systems of one or more shipping service providers (e.g., USPS, UPS, FedEx, DHL, local carriers, regional couriers, TL services, LTL services, etc.) and/or shipping facilitation service provider (e.g., Stamps.com Inc., Auctane LLC, etc.) configured for generating shipping documents for item shipments. Shipping document processing systems 120A-120C may, for example, comprise a plurality of systems of a particular shipping service provider for serving a large number of shippers, to provide redundancy, etc. Alternatively, shipping document processing systems 120A-120C may comprise a plurality of systems of a particular shipping facilities service provider for serving their customers, to provide redundancy, etc.

Shipper systems 130A and 130B may be used by respective shippers to interface with one or more of shipping document processing systems 120A-120C executing corresponding document processing logic 121A-121C for processing and/or generation of various shipping documents (e.g., bills of lading, packing slips, shipping labels, postage indicia, customs forms, etc.) for shipment of items. Embodiments of document processing logic 121A-121C may, for example, comprise instances of the STAMPS.COM postage on demand system operated by Stamps.com Inc., the SHIPSTATION shipping management system operated by Auctane LLC, and/or the like configured in accordance with concepts herein to operate with respect to allocated tokens in association with shipping document processing, as described herein. For example, computer 131A of shipper system 130A may interface with a selected one of shipping document processing systems 120A-120C (e.g., a currently operational one of the shipping document processing systems nearest the shipper's location, a shipping document processing system having capacity to provide processing for the shipper, etc.) to generate shipping document 133A (e.g., a shipping label for item 136A) comprising address information (e.g., destination address and return address), tracking number 134A (e.g., for facilitating tracking the progress of item 136A from a shipper to a recipient), and indicia 135A (e.g., postage indicia, value bearing indicia, or some other form of indicia for providing payment to the shipping service provider for shipping services), whereby shipping document 133A is printed using printer 132A for application on item 136A. Similarly, computer 131B of shipper system 130B may interface with a selected one of shipping document processing systems 120A-120C (e.g., a currently operational one of the shipping document processing systems nearest the shipper's location, a shipping document processing system having capacity to provide processing for the shipper, etc.) to generate shipping document 133B (e.g., a shipping label for item 136B) comprising address information (e.g., destination address and return address) and tracking number 134B (e.g., for facilitating tracking the progress of item 136B from a shipper to a recipient), whereby shipping document 133B is printed using printer 132B for application on item 136B.

The above mentioned tracking numbers may, for example, comprise a token (e.g., a member from a set of sequence number sequence numbers, series of different alphanumeric or character strings, plurality of different symbols or symbol strings, etc.) used to provide a substantially unique tracking number (i.e., remaining unique over the useful life of any instance of a tracking number comprising the token). A tracking number may comprise data or information in addition to such a token, such as to include mailer identification (ID) concatenated with the token and/or still other data/information. As a specific example, a tracking number may be 16 characters (e.g., as may be comprised of 5 characters of mailer ID and 11 characters of a token, 9 characters of mailer ID and 7 characters of a token, etc.). Allocations of tokens available for use by shipping document processing systems 120A-120C may be stored in token databases 123A-123C, respectively, wherein corresponding token management logic 122A-122C may operate to provide management of the tokens and their dissemination by the shipping document processing systems.

Irrespective of whether or not a token is concatenated with additional information, the quantity of unique tokens for any particular character length of token (e.g., a token of 11 characters or a token of 7 characters, as in the above examples) is limited. Moreover, various shipping facilitation service providers may be assigned subsets (e.g., subranges within a sequence set) by a shipping service provider to enable each of a plurality of shipping facilitation service providers to disseminate tracking numbers to their customer/shippers using the shipping services of the shipping service provider. Accordingly, the quantity of unique tokens available for use by such shipping facilitation service providers may be appreciably less than that of the total quantity of unique tokens. Because the number of tokens is limited and the number of items being shipped over any period of time is typically quite large, the tokens are reused in time. Nevertheless, embodiments of the present invention operate to control the use of the tokens to provide for their being substantially unique in use (e.g., tacking numbers comprising the tokens are non-overlapping such that 2 instances of tracking numbers having the same token are not in use simultaneously).

Token coordinator logic 110 of embodiments of the present invention operates, such as under control of token allocation and maintenance logic 111, to allocate tokens to the shipping document processing systems 120A-120C for their use by the respective document processing logic 121A-121C, such as in disseminating tracking numbers in association with shipping document processing. In operation according to embodiments, shipping document processing systems 120A-120C are enabled to independently perform shipping document processing for extended periods of time (e.g., day(s), week(s), month(s), etc.) using their respective allocations of tokens. The period of time over which the shipping document processing systems are expected to independently operate with respect to a token allocation may be a period of time selected using an adjustable token allocation period parameter ($TA_{Period}$). The token allocation period ($TA_{Period}$) utilized according to embodiments of the invention may, for example, be of sufficient length to allow for continued shipping document processing throughout a period of system failure, recovery, and/or maintenance (e.g., communication link failure between one or more shipping document processing system and token coordinator system, failure and recovery of token coordinator system, etc.).

As will be better appreciated from the discussion which follows, shipping document processing systems 120A-120C of embodiments are enabled to disseminate tracking numbers comprising tokens, including reuse of the tokens over time, without overlap (e.g., without introducing overlapping instances of tracking numbers). Shipping document processing systems 120A-120C of embodiments thus operate to provide resilient simultaneous and independent dissemination of the tracking numbers.

Figure 2:
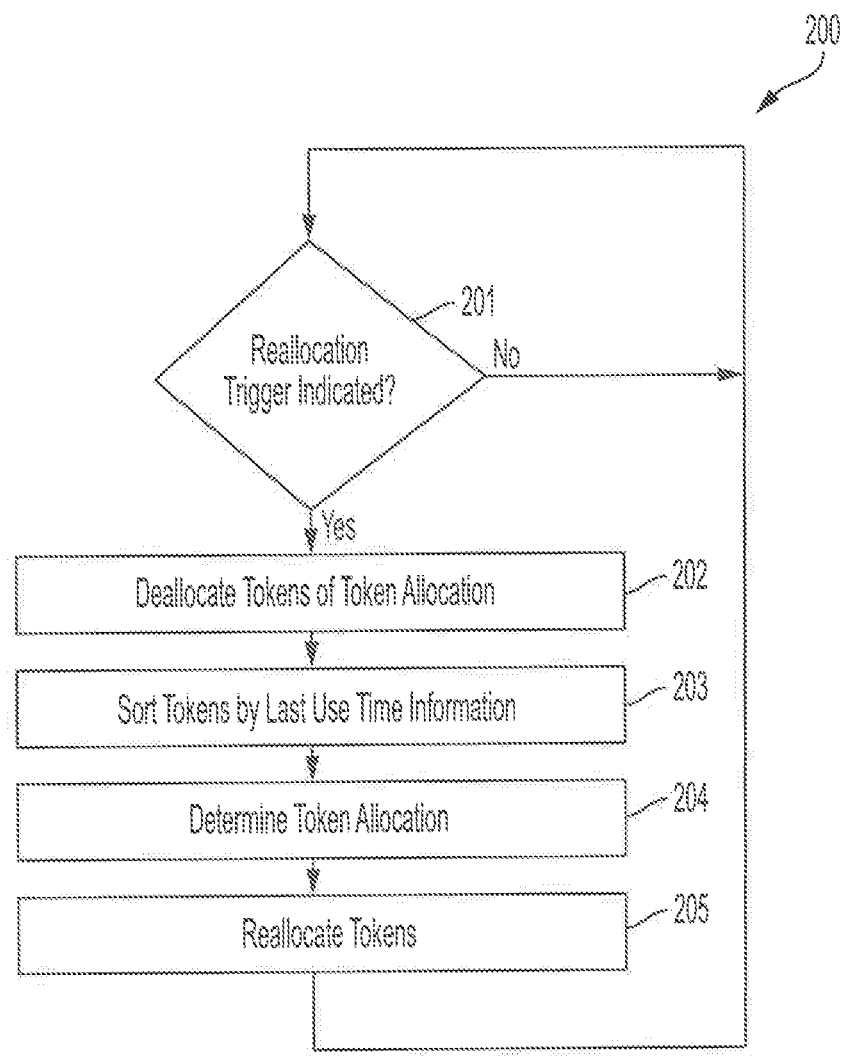
FIG. 2 shows an example flow for allocation and maintenance of tokens in accordance with embodiments of the present invention.

FIG. 2 shows flow 200 illustrating exemplary operation by token allocation and maintenance logic 111 for allocation and maintenance of tokens in accordance with embodiments of the present invention. Logic defining operation according to flow 200 may, for example, be stored in a memory of token coordinator system 110 for execution by a processor thereof.

Figure 3A:
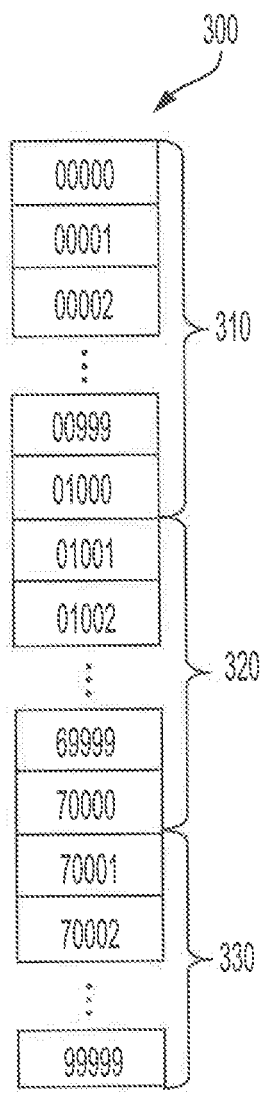
FIG. 3A shows a token sequence set divided into token pools as may be assigned to different shipping facilitation service providers in accordance with embodiments of the present invention.

In the example of FIG. 2, a pool of tokens available for allocation to the shipping document processing systems may be stored in token database 112 of token coordinator system 110. Shipping document processing systems 120A-120C may comprise a plurality of shipping document processing systems of a particular shipping facilitation service provider (e.g., Stamps.com Inc., Auctane LLC, etc.). A shipping service provider (e.g., USPS, UPS, FedEx, DHL, local carriers, regional couriers, TL services, LTL services, etc.) for which the shipping facilitation service provider provides generation of shipping documents may assign one or more subsets of tokens for use by the shipping facilitation service provider (e.g., other subsets of tokens may likewise be assigned to other shipping facilitation service providers). Such subsets of tokens may, for example, comprise one or more subranges within a sequence set. For example, token sequence set 300 of the example in FIG. 3A is divided into token pools 310-330, one or more of which may be assigned to different shipping facilitation service providers. As a specific example, token pool 320 may be assigned for use by a shipping facilitation service provider associated with shipping document processing systems 120A-120C, and thus token database 112 of token coordinator system 110 may store this pool of tokens for allocation among shipping document processing systems 120A-120C.

FIG. 3B shows an example of token database 112 storing token pool 320 available for allocation to shipping document processing systems in accordance with embodiments of the present invention. It should be appreciated that embodiments of the invention accommodate the use of very large pools of tokens (e.g., pools of hundreds of thousands of tokens, millions of tokens, etc.) to support large scale shipping document processing. Accordingly, the tokens may be handled as blocks of tokens (e.g., blocks of hundreds of tokens, thousands of tokens, tens of thousands of tokens, etc.) by token allocation and maintenance logic 111 to simplify aspects of their handling and reduce impact upon processing and/or storage resources. Accordingly, in the example of FIG. 3B, token pool 320 is divided into blocks of 1000 tokens for allocation to the shipping document processing systems. The tokens themselves are shown as being stored as token ranges (e.g., beginning token and ending toking), such as may be useful in reducing storage requirements, providing for more efficient use of resources in determining and communicating token allocations, etc. It should be understood, however, that the concepts are applicable to blocks of tokens sized differently than those of the illustrated example, including blocks of individual tokens. The size of the blocks of tokens may be dynamically adjustable (e.g., using a token block size, $TB_{Size}$, parameter), such as to adapt to increases/decreases in the speed at which tokens are disseminated by the shipping document processing systems, to facilitate longer/shorter periods of time in which shipping document processing systems are enabled to independently perform shipping document processing using their respective allocations of tokens, etc.

Token allocation and maintenance logic 111 of token coordinator system 110 allocates tokens of the token pool to the individual shipping document processing systems for their independent operation over some period of time. To facilitate the allocation of tokens and/or using tokens from the allocations having an oldest last use time first, token database 112 of embodiments stores additional information in association with the tokens. For example, information stored in association with the tokens in the illustrated embodiment of token database 112 includes token block identification information 301, use time information 303 (shown in this example as including begin use time and end use time), and allocation status information 304. Token block identification information 301 provides information used for identifying the individual blocks of tokens of the pool. Use time information 303 provides information to facilitate reuse of the tokens without overlap, as will be better understood from the discussion which follows. Allocation status information 304 provides information regarding the current allocation of the token blocks, such as by designating a shipping document processing system to which the token block is allocated (e.g., allocation status=1 corresponds to shipping document processing system 120A, allocation status=2 corresponds to shipping document processing system 120B, and allocation status=3 corresponds to shipping document processing system 120C) or remaining null or having some other predetermined value for designating that the token block is currently unallocated. Such additional information associated with the tokens is utilized in providing token allocation and maintenance according to embodiments of the invention.

Last use time as utilized according to embodiments of the invention may, for example, be determined by the dissemination time of the shipping document processing. Additionally or alternatively, last use time may be determined by a scan event (e.g., last scan event) as provided by one or more shipping service providers (e.g., USPS, UPS, FedEx, DHL, local carriers, regional couriers, TL services, LTL services, etc.).

The number of tokens in the pool of tokens available for use with respect to shipping document processing is limited and thus shipping document processing systems 120A-120C reuse the tokens of the token pool over time. In order to prevent overlapping use of tokens, a threshold time before reuse of a token ($Thresh_{Reuse}$) may be selected, wherein the threshold may correspond to an expected maximum amount of time an instance of use of the token is likely to remain active (e.g., a maximum amount of time for shipping services to be performed with respect to a shipped item using a tracking number comprising a token). Existing shipping document processing systems generally rely upon a number of sequence numbers in a pool of available sequence numbers being sufficiently large to accommodate serial reuse of the sequence numbers such that reuse of a sequence number occurs at or after the desired threshold time. For example, if the threshold time for sequence number reuse is 6 months, shipping document processing systems operating according to existing techniques will cycle through a 6 month supply of sequence numbers. Such existing techniques typically provide each sequence number for reuse in sequence, irrespective of when the sequence number was last used.

Although meeting a token reuse time threshold decreases the likelihood of overlapping instances of use with respect to any particular token, instances of overlapping use of instances of the tokens may nevertheless result (e.g., resulting in a shipper receiving tracking information for another shipper's item as a result of token reuse). Embodiments of token allocation and maintenance logic 111 of token coordinator system 110 therefore operate to allocate tokens in a manor configured for the reuse of tokens from the token pool having a longest period since a previous use.

It should be appreciated that, and as will be better understood from the discussion below, tokens used having an oldest last use time first may be used/reused out of sequential order. For example, as shown by token blocks 04 and 06 of FIG. 3B gaps may exist in the sequence of tokens utilized according to embodiments of the invention. Additionally, as shown by token blocks 05 and 08 of FIG. 3B, tokens may be utilized in an order reversed with respect to the sequence of tokens.

Referring again to FIG. 2, operation by token allocation and maintenance logic 111 at block 201 determines if a reallocation trigger with respect to a shipping document processing system is indicated. Determinations regarding whether one or more reallocation triggers are indicated, and thus reallocation of tokens is to be undertaken with respect to a shipping document processing system of shipping document processing systems 120A-120C, may be performed independently by token allocation and maintenance logic 111, may be performed by token allocation and maintenance logic 111 in cooperation with other systems, etc. For example, token allocation and maintenance logic 111 may communicate with each of shipping document processing systems 120A-120C (e.g., periodically, upon the occurrence of an event, etc.) to analyze the status and use of a respective token allocation for determining if one or more reallocation triggers is indicated. Additionally or alternatively, token allocation and maintenance logic 111 may independently analyze various available information (e.g., time periods, network communication status, system status reports, transaction reports, etc.) for determining if one or more reallocation triggers are indicated.

As previously mentioned, shipping document processing systems 120A-120C of embodiments of the present invention are enabled to independently perform shipping document processing for some period of time (e.g., $TA_{Period}$, wherein $TA_{Period}$ may be hours, days, weeks, etc.) using their respective allocations of tokens. One or more reallocation triggers ($RA_{Trigger}$) may, for example, be analyzed for initiating allocation/reallocation of tokens to facilitate shipping document processing systems 120A-120C maintaining allocations of tokens sufficient to support their independent use of the tokens over the token allocation period ($TA_{Period}$). Reallocation triggers utilized according to embodiments of the invention may comprise particular events, periods of time, etc.

In an example of events based reallocation triggers, token management logic 122 of a shipping document processing system may monitor the use of tokens allocated to the shipping document processing system and may provide a reallocation trigger message (e.g., a $RA_{Trigger}$ may be a particular message or signal from a shipping document processing system) to token coordinator system 110 when it is determined that reallocation of tokens is desired. Such reallocation trigger messages may be provided by token management logic 122 in response to a query by token allocation and maintenance logic 111 (e.g., during a communication session periodically or otherwise initiated by token allocation and maintenance logic 111) and/or autonomously by the token management logic 122 (e.g., in response to a determination by token management logic 122 that token reallocation is desired). A reallocation trigger message for facilitating increasing a number of tokens allocated to the shipping document processing system may, for example, be provided when a number of unused tokens in its current allocation reaches a threshold, when analysis of the rate of dissemination of tokens appears to exceed the unused tokens for the remaining token allocation period, when a token allocation has been exhausted, etc. Additionally or alternatively, a reallocation trigger message for facilitating decreasing a number of tokens allocated to the shipping document processing system may be provided when unused tokens of the allocated tokens remain unused beyond a threshold time, when analysis of the rate of dissemination of tokens suggests excess tokens will remain from the allocated tokens at the end of the token allocation period, etc. Such reallocation triggers may, for example, be utilized to enable some level of token reallocation control by the shipping document processing systems and/or other systems external to the token coordinator system.

In another example of events based reallocation triggers, token allocation and maintenance logic 111 of token coordinator system 110 may monitor for one or more activities, actions, or states (e.g., $RA_{Trigger}$ may be receipt of a particular message or signal, detection of a particular state of a system, detection of the occurrence of a specific event, etc.) to identify a reallocation trigger. Such activities, actions, or states may be detected by token allocation and maintenance logic 111 during communication with token management logic 122 (e.g., during a communication session periodically or otherwise initiated by token allocation and maintenance logic 111) and/or may be detected independently by token allocation and maintenance logic 111 (e.g., by analyzing information available to token allocation and maintenance logic 111). For example, token allocation and maintenance logic 111 may detect when a shipping document processing system comes on-line (e.g., initially provisioned, returns to service after a failure, recovers from a communication failure, etc.) as a reallocation trigger. Additionally or alternatively, token allocation and maintenance logic 111 may detect when token coordinator system 110 comes on-line (e.g., returns to service after a failure, recovers from a communication failure, etc.) as a reallocation trigger. Such reallocation triggers may, for example, be utilized to facilitate rapid recovery from operational anomalies or other occurrences within the system.

In an example of time based reallocation triggers, token allocation and maintenance logic 111 of token coordinator system 110 may monitor one or more times in association with the operation of shipping document processing systems and/or their allocations of tokens (e.g., a $RA_{Trigger}$ may be expiration of a time period, the occurrence of a particular time, a cycle have predetermined periodicity, etc.) to identify a reallocation trigger. Various times and/or time periods may be analyzed by token allocation and maintenance logic 111 during communication with token management logic 122 (e.g., during a communication session periodically or otherwise initiated by token allocation and maintenance logic 111) and/or may be independently determined by token allocation and maintenance logic 111 (e.g., by analyzing information available to token allocation and maintenance logic 111). Token allocation and maintenance logic 111 may, for example, monitor a time period from a previous reallocation of tokens and/or a time period to an end of a token allocation period (e.g., one or more reallocation time thresholds may be utilized) with respect to shipping document processing systems to determine if token reallocation is indicated. In operation according to embodiments, a reallocation time threshold may be established such that a time based reallocation trigger is indicated prior to the expiration of a token allocation period for a last token allocation made to a respective shipping document processing system. Such embodiments may, for example, provide for a reallocation trigger in sufficient time prior to the expiration of the token allocation period (e.g., a time threshold for $RA_{Trigger} < TA_{Period}$) to ensure that all tokens of the current token allocation are not disseminated by the respective shipping document processing system (i.e., exhausting the token allocation). Embodiments may, for example, implement such a time based reallocation trigger at a point into the token allocation period determined sufficiently in advance of the end of the time period in which the current token allocation is configured for to avoid all tokens from having been disseminated, but providing a sufficient duration of time to enable efficient operation of the systems (e.g., $RA_{Trigger} = \frac{1}{2} TA_{Period}$, $\frac{2}{3} TA_{Period}$, $\frac{3}{4} TA_{Period}$, etc.). In addition to avoiding exhaustion of the tokens of the token allocation of a corresponding shipping document processing system, such a reallocation trigger provides reallocation of tokens with more frequency than the reallocation period, thereby avoiding tokens becoming stale (i.e., languishing in a token allocation that is being underutilized), and instead provides for reallocation of the tokens to other shipping document processing systems which may dissemination the tokens more timely. Such reallocation triggers may, for example, be utilized to dynamically adjust token allocations as demand increases/decreases.

Irrespective of the particular reallocation triggers used, if it is determined at block 201 that no reallocation trigger with respect to any of the shipping document processing systems is indicated, processing according to the illustrated embodiment returns to block 201 for operation to continue to monitor for one or more reallocation triggers. For example, in operation where token allocation and maintenance logic 111 performs determinations regarding whether one or more reallocation triggers are indicated cooperatively with respective shipping document processing systems of shipping document processing systems 120A-120C, token allocation maintenance logic 111 may iteratively communicate with each such shipping document processing system for determining if reallocation triggers are indicated by repeatedly returning to block 201. Additionally or alternatively, in operation where token allocation and maintenance logic 111 independently performs determinations regarding whether one or more reallocation triggers are indicated, such monitoring may be continued through repeatedly returning to block 201.

If it is determined at block 201 that a reallocation trigger with respect to a shipping document processing system is indicated, operation according to the illustrated embodiment proceeds to initiate processing for token reallocation according to embodiments of the invention. Although not expressly shown in the processing blocks of flow 200, it should be appreciated that token reallocation operation may include token allocation and maintenance logic 111 establishing communication with token management logic 122A. For example, where it is determined that a reallocation trigger is indicated for a particular shipping document processing system at block 201 by token allocation and maintenance logic 111 independently performing the determination, processing at block 202 may include token coordinator system 110 establishing a communication link with the shipping document processing system of shipping document processing systems 120A-120C that the reallocation trigger was indicated. If, however, it is determined that a reallocation trigger is indicated for a particular shipping document processing system at block 201 by token allocation and maintenance logic 111 performing the determination in cooperation with the particular shipping document processing system, a communication link with that shipping document processing system may already be established (e.g., having been established in processing according to block 201).

Irrespective of when communication is established (e.g., prior to the reallocation trigger indication determination or after) between token coordinator system 110 and a shipping document processing system of shipping document processing systems 120A-120C for which token reallocation is being initiated, processing at block 202 the illustrated embodiment provides for deallocation of tokens of the tokens currently allocated to the shipping document processing system. For example, the tokens of blocks of tokens that have been used by the shipping document processing system during the current token allocation period may be deallocated for later reuse once sufficiently aged within the token pool. Additionally or alternatively, tokens of blocks of tokens that have remained unused by the shipping document processing system may be deallocated. As will be better understood from the examples which follow, such deallocation of unused tokens prior to reallocating tokens for use by the shipping document processing system facilitates providing tokens having the oldest last use time first, such as where tokens previously allocated for use by another shipping document processing system and having a relatively old last use time are deallocated and returned to the token pool. Moreover, such deallocation of unused tokens facilitates balancing of token allocations in response dynamic conditions, such as to reallocate fewer tokens than previously allocated to the shipping document processing system. Embodiments of the invention may, however, omit the deallocation of unused tokens at block 202, such as where reallocation of tokens (e.g., at block 205) provides for deallocation of previously allocated tokens in excess of a currently determined token allocation.

Referring again to FIG. 3B, it can be seen that in the embodiment illustrated therein tokens of token pool 320 currently allocated to shipping document processing systems 120A-120C are designated in token database 112 with allocation statuses 1, 2, and 3, respectively. FIGS. 4A-4C show examples of token databases 123A-123C of respective shipping document processing systems 120A-120C corresponding to the token allocations designated in FIG. 3B. In particular, token database 123A is shown storing token allocation 420A corresponding to the token blocks of token pool 112 having allocation status=1, token database 123B is shown storing token allocation 420B corresponding to the token blocks of token pool 112 having allocation status=2, and token database 123C is shown storing token allocation 420C corresponding to the token block of token pool 112 having allocation status=3.

To facilitate using tokens from the allocation having an oldest last use time first, token databases 123A-123C of embodiments store additional information in association with the tokens of the token allocations. For example, information stored in association with the tokens in the illustrated embodiments of token databases 123A-123C includes token block identification information 301, use time information 303 (shown in this example as including begin use time and end use time), next token information 402, and token block status information 404. Token block identification information 301 and use time information 303 provides the information as described above with respect to token pool 320 of token database 112. Next token information 402 provides information regarding a next one of the tokens of the token block for dissemination or other use by the shipping document processing system (e.g., the next unused token of the tokens within the token block). Token block status information 404 provides information regarding a use state of the respective token block (e.g., "used" state corresponding to all the tokens of the token block having been used by the shipping document processing system in the current token allocation period, "in use" state corresponding to the shipping document processing system having accessed one or more tokens of the token block for use while at least one token of the token block remains unused, and "available" state corresponding to all tokens of the token block remaining unused during the current token allocation period). Such additional information provided in association with the tokens is utilized in providing token management according to embodiments of the invention.

In the exemplary embodiments of token databases 123A-123C, the tokens of token allocations 420A-420C retain their token block information (e.g., token block identification information 301) utilized with respect to token pool 320. Such token block information may, for example, be used to provide an index for uniquely identifying the individual blocks of tokens whether in the token pool or a token allocation.

In operation according to embodiments, tokens of token allocations in token databases 123A-123C which remain unused may retain their use time information utilized with respect to token pool 320 (e.g., as shown for available token block 03 of FIG. 4A and available token block 07 of FIG. 4B). Such retained use time information may, for example, be utilized by token management logic 122 in sorting or otherwise selecting tokens of the token allocation for using tokens from the allocation having an oldest last use time first. In accordance with some embodiments, however, use time information for unused tokens may not be maintained within the token databases of the shipping document processing systems. For example, where the tokens are provided to the shipping document processing systems by the token coordinator system in the order of their preferred use, such use time information may be superfluous. Nevertheless, use time information 303 of the exemplary embodiments of token databases 123A-123C illustrated in FIGS. 4A-4C is updated with use time information by the shipping document processing system. For example, begin use time information may be updated (e.g., as shown for used token block 01 and in use token block 02 of FIG. 4A, in use token block 06 of FIG. 4B, and in use token block 04 of FIG. 4C) by the token management logic when a first token of a block of tokens is accessed for dissemination, is disseminated, and/or is otherwise used by the respective shipping document processing system. Likewise, end use time information may be updated (e.g., as shown for used token block 01 of FIG. 4A) by the token management logic when a last token of a block of tokens is accessed for dissemination, is disseminated, or is otherwise used by the respective shipping document processing system. Where a block of tokens comprises a single token, the beginning use time information may be omitted, either or both of begin use time and end use time information may be updated by the token management logic when the token is accessed for dissemination, is disseminated, or is otherwise used by the respective shipping document processing system. Accordingly, when a token or tokens of a token allocation are used or in use by a respective shipping document processing system, corresponding use time information 303 of embodiments may be updated to reflect such use.

Having described exemplary embodiments of token databases 123A-123C providing tokens allocated for dissemination by the shipping document processing systems (e.g., as tracking numbers in association with shipping documents), processing at block 202 of FIG. 2 is described with reference to a case in which a token reallocation trigger has been determined to be indicated with respect to shipping document processing system 120A, to aid in understanding concepts of the present invention. Accordingly, in this example deallocation of tokens of the tokens currently allocated to shipping document processing system 120A (e.g., tokens of token allocation 420A) is performed. As shown in token database 123A of FIG. 4A, token block 01 of token allocation 420A is indicated as "used" by token status information 404 indicating all tokens of the token block have been used during the current token allocation period. Accordingly, token block 01 may be deallocated from the token allocation for shipping document processing system 120A, and the use time information in token database 112 updated accordingly, as shown in the updated instance of token database 112 of FIG. 3C. Also as shown in token database 123A of FIG. 4A, token block 03 of token allocation 420A is indicated as "available" by token status information 404 indicating all tokens of the token block remain unused during the current token allocation period. Accordingly, token block 03 may be deallocated from the token allocation for shipping document processing system 120A, and the use time information in token database 112 not updated, as shown in the updated instance of token database 112 of FIG. 3C. It should be appreciated that token blocks 01 and 03 may likewise be updated in token database 123A of shipping document processing system 120A (e.g., deleted from token database 123A, designated as "deallocated" in the token block status information, etc.) to designate their deallocated status. FIG. 5 shows an example of token database 123A updated in accordance with the deallocation of tokens of token allocation 420A.

It should be appreciated that token block 02 of token allocation 420A is indicated as "in use" by token status information 404 indicating that the shipping document processing system has accessed one or more tokens of the token block for use, although not all tokens of the token block have been used during the current token allocation period. Deallocation of tokens in processing according to block 202 of embodiments does not operate to deallocate a token block of the token allocation that is neither fully used nor fully unused, such as to avoid partially used token blocks in the token pool.

Having deallocated tokens of the token allocation for the shipping document processing system for which one or more reallocation triggers were indicated, processing according to the illustrated embodiment of flow 200 proceeds to block 203 for processing to sort the token pool. Operation by token allocation and maintenance logic 111 may, for example, sort the tokens of the token pool according to last use time information 303 for use in reallocation of tokens having an oldest last use time first. For example, token allocation and maintenance logic 111 may utilize end use time of use time information 303 for each block of tokens to sort the tokens according to their last use time. Where new tokens that are previously unused are included in the token pool, they may be considered as having the oldest last use time for purposes of sorting.

Token pool 320 of database 112 shown in FIG. 3C is sorted according to end use time of use time information 303. It can be appreciated by comparing FIGS. 3B and 3C that deallocated tokens having updated use time information (e.g., token block 01 having had all tokens thereof disseminated by shipping document processing system 120A in the token allocation period) are appropriately moved in the token pool. Similarly, although not specifically shown in the example tokens of token pool 112 shown in FIG. 3C, tokens which were previously allocated to another shipping document processing system, but which remained unused and were deallocated in accordance with the above, may have use time information indicating an older last use time than that of tokens (e.g., token block 03 deallocated from shipping document processing system 120A) which were previously allocated to the shipping document processing system presently the subject of token reallocation, and thus may be appropriately placed in the token pool for reallocation. Sorting the tokens of the token pool based upon last use time information is thus utilized according to embodiments of the invention to facilitate use of tokens having an oldest last use time first.

At block 204 of the embodiment of flow 200 shown in FIG. 2, an allocation of tokens for the shipping document processing system for which one or more reallocation triggers were indicated is determined. In operation according to embodiments of the invention, token allocation and maintenance logic 111 determines a token allocation for the shipping document processing system for a next token allocation period based upon statistical, historical, predicted, etc. data for the shipping document processing system itself and/or for the shipping document processing systems in general. The determination of an allocation of tokens may further be based upon current information with respect to the shipping document processing system(s) (e.g., the number of tokens remaining allocated to the shipping document processing system, the number of tokens remaining for allocation to shipping document processing systems, etc.).

As an example of processing performed in determining an allocation of tokens, the token allocation and maintenance logic may analyze statistics regarding how many tokens the shipping document processing system(s) disseminate in a token allocation period ($TA_{Period}$), such as using historical information, prophetic information, etc. For example, embodiments may determine a token allocation based upon a statistical quantification (e.g., average, mean, etc.) of tokens disseminated by the shipping document processing system in a plurality of instances of the time span of the token allocation period (e.g., average or mean over a year, month, etc. of token allocation periods). Additionally or alternatively, a token allocation determination may be based upon a statistical quantification (e.g., average, mean, etc.) of tokens disseminated by a plurality of the shipping document processing systems (e.g., average or mean over a single token allocation period for all similar shipping document processing systems, average or mean over a plurality of instances of the time span of the token allocation period for a plurality of shipping document processing systems, etc.). Further, embodiments may additionally or alternatively determine a token allocation based upon historical information (e.g., an immediately preceding time span of a token allocation period, a time span of a token allocation period for a same time frame in a previous year, a plurality of preceding time spans of a token allocation period, etc.) with respect to the shipping document processing system(s). Embodiments may additionally or alternatively determine a token allocation based upon a predicted number of tokens to be disseminated in the time span of the token allocation period (e.g., estimates extrapolated from historical data, predictions based upon occurrences of events, such as holidays, in or around the time span of a token allocation period, etc.). Certain information may be upon which token allocation determinations are based may be weighted, such as to more heavily weight information corresponding to the shipping document processing system for which the determination is made, to more heavily weight information for a time frame in a previous year corresponding to a present time frame in which the determination applies, to less heavily weight prophetic information, etc.

In operation according to embodiments of flow 200 shown in FIG. 2, tokens are reallocated to the shipping document processing system of shipping document processing systems 120A-120C for which token reallocation is being performed. For example, tokens in accordance with the token allocation determined in accordance with processing at block 201 may be reallocated to the shipping document processing system for use in a next token allocation period. Embodiments of the invention operate to allocate the tokens having the oldest use information (e.g., end use time) which are not otherwise allocated (e.g., the top most tokens in sorted token pool 112 which have no shipping document processing system allocation status) to thus allocate tokens having an oldest last use time first.

Continuing with the above specific case in which a token reallocation trigger has been determined to be indicated with respect to shipping document processing system 120A, it may be determined at block 204 that 3 token blocks are to be allocated to shipping document processing system 120A, in addition to partially used token block 02 remaining allocated to the shipping document processing system. Accordingly, token allocation and maintenance logic 111 may access token database 112 to select the 3 top most token blocks therein which are not currently allocated (i.e., token blocks 03, 05, and 08) for allocating to shipping document processing system 120A at block 205.

Prior to allocating the tokens to the shipping document processing system, token allocation and maintenance logic 111 of embodiments may analyze the tokens for suitability for allocation. For example, as discussed above, a threshold time before reuse of a token ($Thresh_{Reuse}$) may have been selected in order to prevent overlapping use of tokens. Accordingly, token allocation and maintenance logic 111 may analyze use time information 303 (e.g., the end use time) in relation to the time of allocating the tokens to determine if the threshold time before reuse of the token is met. If it is not, the subject token(s) may be excluded from the token allocation (e.g., token allocation and maintenance logic 111 may operate to request additional tokens from a shipping service provider for adding to token pool 112, may initiate token reallocation processing with respect to one or more other shipping document processing systems in an attempt to identify unused tokens for reallocation to the current shipping document processing system, etc.). For example, if the tokens in token pool 320 is insufficient to sustain token allocations having last use time information greater than a threshold time before reuse of a token (e.g., $END\_USE\_TIME > Thresh_{Reuse}$), such as where the rate of dissemination of tokens by the shipping document processing system exceeds the availability of sufficiently aged tokens in the token pool, then additional tokens may be requested from the shipping service provider. Such new tokens are to be added to the pool of tokens (e.g., token pool 320 stored in database 112) for allocation among shipping document processing systems 120A-120C. The token pool is preferably resorted according to last use time information when new tokens are added to facilitate use of tokens having an oldest last use time first. Assuming, however, that one or more of the tokens are suitable for allocation, those tokens are reallocated to shipping document processing system 120A at block 205.

FIG. 3D shows token pool 112 of the example updated to reflect reallocation of 3 token blocks (token blocks 03, 05, and 08) to shipping document processing system 120A (i.e., resulting in token allocation 420A comprising partially used token block 02 and unused token blocks 03, 05, and 08 for use in a new/next token allocation period). Correspondingly, FIG. 6 shows an example of token database 123A updated in accordance with the reallocation of tokens of token allocation 420A. Shipping document processing system 120A has thus been provided a reallocation of tokens enabling the shipping document processing system to independently perform shipping document processing for a period of time (e.g., days, weeks, etc.) corresponding to the token allocation period ($TA_{Period}$). In operation according to embodiments, the time period of a next token allocation period is thus begun with respect to the shipping document processing system.

It should be appreciated that a time of the foregoing reallocation is prior to the expiration of a token allocation period for a last token allocation made to a respective shipping document processing system, and thus exhaustion of the tokens of that token allocation by the independent operation of the shipping document processing system is avoided. Such operation facilitates uninterrupted operation of the shipping document processing systems accommodating dynamic conditions, such as outages or failures of various of the systems, increases or decreases in demand at various of the shipping document processing systems, etc.

After reallocation of the tokens at block 205, the illustrated embodiment of flow 200 returns to block 201 for operation to continue to monitor for one or more reallocation triggers. For example, in operation where token allocation and maintenance logic 111 performs determinations regarding whether one or more reallocation triggers are indicated cooperatively with respective shipping document processing systems of shipping document processing systems 120A-120C, token allocation maintenance logic 111 may iteratively communicate with each such shipping document processing system for determining if reallocation triggers are indicated by returning to block 201. Additionally or alternatively, in operation where token allocation and maintenance logic 111 independently performs determinations regarding whether one or more reallocation triggers are indicated, such monitoring may be continued through returning to block 201.

It can be appreciated from the foregoing that repeated operation according to flow 700 with respect to all of the shipping document processing systems of system 100 facilitates balancing of token allocations for uninterrupted operation of the shipping document processing systems. Such operation provides for dynamic adjusting of the token allocations allowing self-corrective operation of the token allocation over time. For example, a new system may be deployed having N number of shipping document processing systems and a token pool containing M number of tokens, whereby some portion of the M tokens may be initially allocated to each of the shipping document processing systems (e.g., distributed equally, distributed according to predicted usage, etc.). Thereafter, operation of token allocation and maintenance logic in according with the exemplary flow above may adaptively reallocate the tokens in response to the usage experienced by each individual shipping document processing system.

Figure 7:
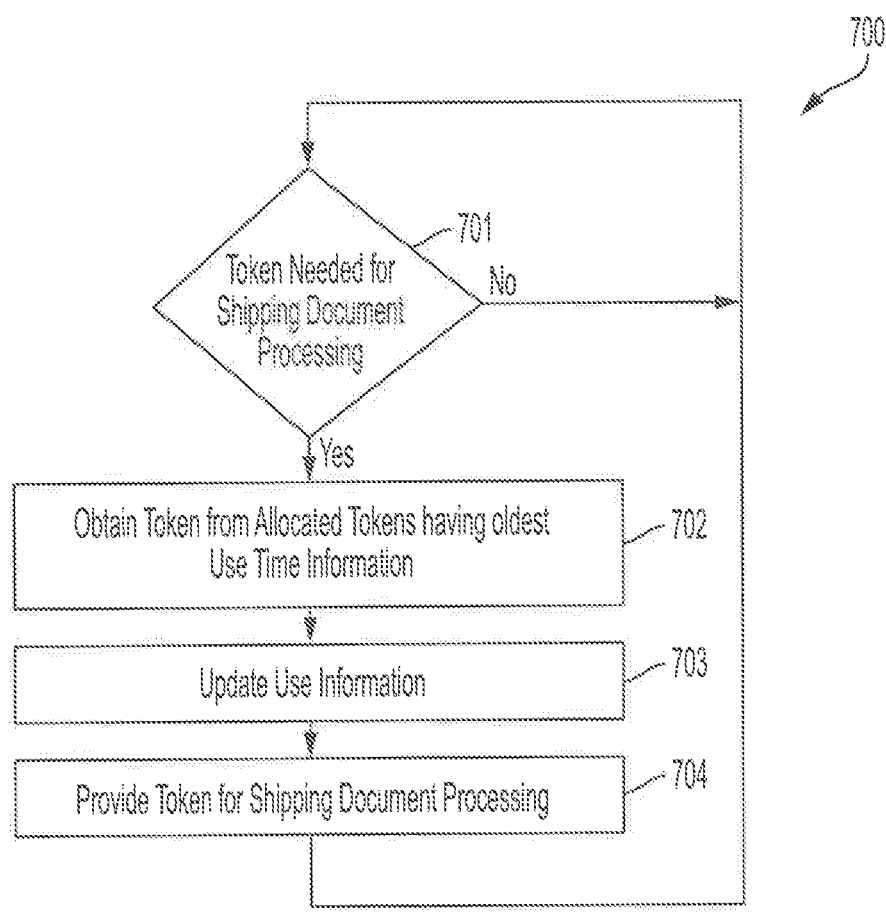
FIG. 7 shows an example flow for dissemination of tokens in accordance with embodiments of the present invention.

Having described exemplary flow 200 providing operation by token allocation and maintenance logic 111 for allocation and maintenance of tokens, attention is now directed to FIG. 7 where flow 700 illustrating exemplary operation by token management logic 122 for dissemination of tokens from respective token allocations for shipping document processing in accordance with embodiments of the present invention is shown. Logic defining operation according to flow 700 may, for example, be stored in a memory of a respective shipping document processing system 120 for execution by a processor thereof.

In the example of FIG. 7, operation by token management logic 122 at block 701 determines if a token is needed for shipping document processing by the shipping document processing system. For example, document processing logic 121 may be performing shipping document processing (e.g., to generate a bill of lading, packing slip, shipping label, postage indicia, customs form, etc.) in response to a request by a shipper (e.g., a user of one of shipper systems 130A or 130B) for shipment of an item (e.g., items 136A and 136B) using the shipping services of one or more shipping service providers. Document processing logic 121 may, for example, request a token for use in generation of a tracking number (e.g., a tracking number comprising a token and additional data, such as mailer ID concatenated with the token and/or still other data). Accordingly, document processing logic 121 may request a token from token management logic 122 when performing shipping document processing. Additionally or alternatively, token management logic 122 of embodiments may monitor operation by shipping document processing system 120 to independently determine that a toke is needed for shipping document processing. Irrespective of the particular way in which token management logic 122 determines that a token is needed, if it is determined that a token is not needed processing according to the illustrated embodiment of flow 700 returns to block 701 to continue to monitor for a need for tokens by the shipping document processing system. However, if it is determined that a token is needed processing according to the embodiment of flow 700 illustrated in FIG. 7 proceeds to block 702.

At block 702 shown in FIG. 7, token management logic 122 obtains a token from token allocation 420 for use in the shipping document processing. In operation according to embodiments, a token having the oldest use time information is selected from token allocation 420 by token management logic 122. For example, token management logic 122 may analyze token block status information 404 to determine if a token block is currently in use. If a token block is not currently in use (e.g., token block status information 404 for no token block is designated "in use"), token management logic 122 may proceed to select a token block of token allocation 420 that is available for use (e.g., token block status information 404 for one or more token block is designated "available"). If more than one token block is available for use (e.g., token blocks 03, 05, and 08 of FIG. 6), token management logic 122 of embodiments selects the token block having the oldest use time information (e.g., an oldest end use time of use time information 303) from which to select a token. If a token block is currently in use (e.g., token block 02 of FIG. 6), token management logic 122 may select that token block for selecting a token from. In operation to select a token having the oldest use time from the token block, embodiments of token management logic 122 may utilize next token information 402 providing information regarding a next one of the tokens of the token block for dissemination (e.g., to obtain token 02101 in the example where token block 02 is selected or to obtain token 03001 in the example where token block 03 is selected).

At block 703 of the illustrated embodiment, token management logic 122 updates use information in correspondence to having obtained a token at block 702. For example, in the example where a token is obtained from a block designated as available, token management logic 122 may change token block status information 404 for this token block (e.g., from "available" to "in use"), may update use time information 303 for this token block (e.g., update the begin use time to a current date and/or time and update the end use time to a null value), and/or may update the next token (e.g., update from obtained token 03001 to next token 03002). Similarly, in the example where a token is obtained from a block designated as in use, token management logic 122 may update the next token (e.g., update from obtained token 2101 to next token 2102), and/or if the obtained token is the last token of the token block change token block status information 404 for this token block (e.g., from "in use" to "used") and update use time information 303 for this token block (e.g., update end use time to a current date and/or time).

The token obtained from the token allocation is provided by token management logic 122 for use by shipping document processing system 120 at block 704 of flow 700. For example, token management logic 122 may provide the token to document processing logic 121 for use in generating a tracking number. Thereafter, document processing logic 121 may generate one or more shipping documents (e.g., bill of lading, packing slip, shipping label, postage indicia, customs form, etc.) to include the tracking number. Irrespective of the particular use to which the token is provided at block 704, processing according to flow 700 proceeds to return to block 701 for continuing to determine if a token is need for shipping document processing.

It can be appreciated from the foregoing that embodiments of the invention provide a hybrid centralized and distributed architecture in which token allocation and maintenance functionality is centralized, while the use of the token allocations (e.g., in tracking number dissemination) is distributed to enable resilient simultaneous and independent dissemination or other use of the tokens by the shipping document processing systems. Such embodiments are particularly well suited to support generation of shipping documents for shipment of items using the shipping services of one or more shipping service providers, to support a large number of shippers throughout a large geographic region. Accordingly, although example embodiments have been described above with reference to a single token pool utilized by token allocation and maintenance logic and a single token allocation utilized by token management logic, multiple ones of such token pools and/or token allocations may be provided, such as to correspond to each of a plurality of shipping service providers for which shipping document processing is provided.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method for token dissemination by a processor-based shipping document processing system of a plurality of processor-based shipping document processing systems, the method comprising:
   receiving by the processor-based shipping document processing system, from a processor-based token coordinator system a token allocation including allocated token blocks along with a token allocation period during which the processor-based shipping document processing system is configured to independently use tokens of the allocated token blocks of the token allocation, wherein each of the allocated token blocks includes a plurality of tokens;
   storing, by the processor-based shipping document processing system, a token database including the token allocation of the allocated token blocks allocated to the processor-based shipping document processing system from a token pool provided for use in shipping document processing by the plurality of processor-based shipping document processing systems, wherein the token database further includes use information stored in association with each of the allocated token blocks of the token pool, wherein the use information includes use time information and token use status information, wherein the use time information includes begin use time information and end use time information for each of the allocated token blocks, and the token use status information includes any one of: a used state, an in use state, or an available state for each of the allocated token blocks;
   disseminating, by the processor-based shipping document processing system, the tokens of the allocated token blocks of the token allocation to at least one shipper during the token allocation period, the disseminating including:
      determining that a token is needed for shipping document processing by the processor-based shipping document processing system;
      obtaining an available token from the allocated token blocks of the token allocation based on the available token having an oldest use time from the use time information for the available token for dissemination by the processor-based shipping document processing system;
      updating at least a portion of the use information in the token database; and
      providing the available token for the shipping document processing to a shipper of the at least one shipper; and
   receiving by the processor-based shipping document processing system, from the processor-based token coordinator system a next token allocation including reallocated token blocks for a next token allocation period.

2. The method of claim 1, wherein the use information stored in association with tokens of the token pool further includes next token information.

3. The method of claim 2, wherein when the available token from the token allocation having oldest use time information obtained for dissemination by the processor-based shipping document processing system comprises a first token of a token block, the updating the at least the portion of the use information comprises:
   updating the next token information to a next token of the token block;
   updating a begin use time of the use time information to correspond to a use time for the available token obtained from the token allocation; and
   updating the token use status information to indicate an in use state of the token block.

4. The method of claim 2, wherein when the available token from the token allocation having oldest use time information obtained for dissemination by the processor-based shipping document processing system comprises a last token of a token block, the updating the at least the portion of the use information comprises:
   updating an end use time of the use time information to correspond to use time for the available token obtained from the token allocation; and
   updating the token use status information to indicate a used state of the token block.

5. The method of claim 2, wherein when the available token from the token allocation having oldest use time information obtained for dissemination by the processor-based shipping document processing system is neither a first token of a token block nor a last token of the token block, the updating the at least the portion of the use information comprises:
   updating the next token information to a next token of the token block without updating the use time information or the token use status information.

6. The method of claim 1, wherein the token allocation period comprises a time span selected from a group consisting of: a day, a week, and a month.

7. The method of claim 1, further wherein the receiving the token allocation from the processor-based token coordinator system is in response to a reallocation trigger with respect to the processor-based shipping document processing system having been indicated.

8. The method of claim 7, wherein the reallocation trigger is a reallocation trigger time period, wherein the reallocation trigger time period is a time period less than the token allocation period.

9. The method of claim 7, wherein the reallocation trigger is an occurrence of a predetermined event.

10. The method of claim 9, wherein the predetermined event comprises an event selected from a group consisting of reestablishing communication between the processor-based shipping document processing system and a processor-based token coordinator system controlling the allocating the tokens from the token pool to the processor-based shipping document processing system, the processor-based shipping document processing system returning to an operational status, and the processor-based token coordinator system returning to an operational status.

11. The method of claim 1, wherein the token allocation for the processor-based shipping document processing system is determined based at least in part on a statistical quantification of tokens disseminated by the processor-based shipping document processing system in a plurality of instances of a time span of the token allocation period.

12. The method of claim 1, wherein the token allocation for the processor-based shipping document processing system is determined based at least in part on a statistical quantification of tokens disseminated by the plurality of processor-based shipping document processing systems.

13. The method of claim 1, wherein the token allocation for the processor-based shipping document processing system is determined based at least in part on historical information with respect to the processor-based shipping document processing system.

14. The method of claim 1, wherein the token allocation for the processor-based shipping document processing system is determined based at least in part on a predicted number of tokens to be disseminated in a time span of the token allocation period.

15. The method of claim 1, wherein the plurality of processor-based shipping document processing systems comprise geographically distributed shipping document processing systems.

16. The method of claim 1, wherein the shipping document processing provided by the processor-based shipping document processing system comprises generation of one or more aspects of shipping labels, wherein the available token is provided in association with a corresponding shipping label.

17. The method of claim 16, wherein the available token is provided in association with the corresponding shipping label to provide tracking information for the corresponding shipping label.

* * * * *